United States Patent
Jones et al.

(10) Patent No.: US 10,112,536 B2
(45) Date of Patent: Oct. 30, 2018

(54) SYSTEM AND METHOD FOR ASSOCIATING CAMERA SENSORS ON A VEHICLE

(71) Applicant: Bendix Commercial Vehicle Systems LLC, Elyria, OH (US)

(72) Inventors: Karl H. Jones, Fullerton, CA (US); Andreas U. Kuehnle, Villa Park, CA (US)

(*) Notice: Subject to any disclaimer, the term of this patent is extended or adjusted under 35 U.S.C. 154(b) by 343 days.

(21) Appl. No.: 14/455,594

(22) Filed: Aug. 8, 2014

(65) Prior Publication Data

US 2016/0039342 A1 Feb. 11, 2016

(51) Int. Cl.
*B60R 1/00* (2006.01)
*H04N 7/18* (2006.01)

(52) U.S. Cl.
CPC .............. *B60R 1/00* (2013.01); *H04N 7/181* (2013.01); *B60R 2300/105* (2013.01); *B60R 2300/302* (2013.01); *B60R 2300/406* (2013.01); *B60R 2300/802* (2013.01)

(58) Field of Classification Search
None
See application file for complete search history.

(56) References Cited

U.S. PATENT DOCUMENTS

| | | | |
|---|---|---|---|
| 5,301,130 A | 4/1994 | Alcone et al. | |
| 5,331,561 A | 7/1994 | Barrett et al. | |
| 6,225,894 B1 | 5/2001 | Kyrtsos | |
| 7,142,098 B2 | 11/2006 | Lang et al. | |
| 7,537,400 B2 | 5/2009 | Schmid | |
| 8,520,070 B1 | 8/2013 | Englander et al. | |
| 8,659,659 B2 | 2/2014 | Bradai et al. | |
| 2006/0050149 A1* | 3/2006 | Lang | B60R 1/00 348/148 |
| 2007/0225872 A1 | 9/2007 | Luebke et al. | |
| 2008/0169144 A1* | 7/2008 | DeGrave | B60L 7/08 180/165 |
| 2008/0177443 A1 | 7/2008 | Lee et al. | |

(Continued)

FOREIGN PATENT DOCUMENTS

| | | |
|---|---|---|
| EP | 2487454 A2 | 8/2012 |
| WO | 2004077378 A1 | 9/2004 |

OTHER PUBLICATIONS

Notification of Transmittal of The International Search Report and The Written Opinion of the International Searching Authority, or the Declaration for related Int'l Appln. No. PCT/US2015/044037, 1 page, dated Jan. 11, 2016.

(Continued)

*Primary Examiner* — Jelani A Smith
*Assistant Examiner* — Paul A Castro
(74) *Attorney, Agent, or Firm* — Brian E. Kondas; Cheryl L. Greenly; Eugene E. Clair

(57) ABSTRACT

A camera system on a vehicle includes an electronic control unit, a base sensor, on a first portion of the vehicle, and a remote sensor on a second portion of the vehicle. The base sensor and the remote sensor communicate with the electronic control unit. The electronic control unit associates the remote sensor with the base sensor based on respective signals received from the base sensor and the remote sensor representing respective measurements of a first physical quantity by the base sensor and the remote sensor.

16 Claims, 8 Drawing Sheets

(56) References Cited

U.S. PATENT DOCUMENTS

| | | |
|---|---|---|
| 2009/0198425 A1* | 8/2009 | Englert .................... B60D 1/30 701/70 |
| 2009/0319121 A1 | 12/2009 | MacDonald et al. |
| 2010/0171828 A1 | 7/2010 | Ishii |
| 2011/0102592 A1 | 5/2011 | Bradai et al. |
| 2012/0033078 A1 | 2/2012 | Huang |
| 2012/0071151 A1 | 3/2012 | Abramson et al. |
| 2012/0280836 A1 | 11/2012 | Roesner |
| 2012/0323474 A1 | 12/2012 | Breed et al. |
| 2013/0035827 A1 | 2/2013 | Breed |
| 2013/0345929 A1 | 12/2013 | Bowden et al. |
| 2014/0022389 A1 | 1/2014 | Kageta |
| 2014/0063253 A1 | 3/2014 | Lee et al. |
| 2014/0081543 A1 | 3/2014 | Fry |
| 2014/0200759 A1* | 7/2014 | Lu .......................... B60D 1/245 701/28 |
| 2015/0081184 A1* | 3/2015 | Braunberger ............. B60T 7/20 701/70 |
| 2016/0039343 A1 | 2/2016 | Jones et al. |

OTHER PUBLICATIONS

International Search Report for related Int'l Appln. No. PCT/US2015/044037, 6 pages, dated Jan. 11, 2016.

Written Opinion of the International Searching Authority for related Int'l Appln. No. PCT/US2015/044037, 6 pages, dated Jan. 11, 2016.

Office Action issued in related U.S. Appl. No. 14/455,606, dated Feb. 23, 2016.

AutoVue® Lane Departure Warning (LDW) System by Bendix CVS, Bendix Commercial Vehicle Systems LLC, BW2880, 4 pages, Jul. 2012.

Installation Instructions AutoVue® Lane Departure Warning (LDW) System (3G) by Bendix CVS, Bendix Commercial Vehicle Systems LLC, S-1580, 12 pages, Aug. 2013.

Limited Warranty AutoVue® Lane Departure Warning (LDW) System by Bendix CVS, Bendix Commercial Vehicle Systems LLC, BW2877, 1 page, Feb. 2013.

Notification of Transmittal of The International Search Report and The Written Opinion of the International Searching Authority, or the Declaration for counterpart Int'l Appln. No. PCT/US2015/044032, 1 page, dated Oct. 30, 2015.

International Search Report for counterpart Int'l Appln. No. PCT/US2015/044032, 4 pages, dated Oct. 30, 2015.

Written Opinion of the International Searching Authority for counterpart Int'l Appln. No. PCT/US2015/044032, 7 pages, dated Oct. 30, 2015.

* cited by examiner

SYSTEM AND METHOD FOR ASSOCIATING CAMERA SENSORS ON A VEHICLE

BACKGROUND

The present invention relates to camera systems for vehicles. It finds particular application in conjunction with associating cameras for an articulated heavy vehicle and will be described with particular reference thereto. It will be appreciated, however, that the invention is also amenable to other applications.

Maneuvering heavy vehicles (e.g., straight trucks, articulated trucks, busses, etc.) can be challenging. For example, maneuvering such heavy vehicles in the reverse direction can be particularly difficult. To aid a vehicle operator in such circumstances, cameras have begun to be incorporated on vehicles. For example, these cameras are typically placed on the sides and back of a vehicle. The operator uses a display to view areas around the vehicle captured by the cameras to assist in maneuvering the vehicle.

Although cameras used on passenger cars may be wired to a display via a cable, wired configurations are not practical on heavy vehicles. More specifically, because the length of a heavy vehicle is almost always longer than that of a passenger car, the length of cable required for heavy vehicles is often prohibitive. In addition, articulated trucks typically include a tractor that can easily couple to, and decouple from, different trailers. Therefore, when other tractors and trailers are nearby, it is necessary to associate the correct sensor(s), which are on respective trailer cameras, with the correct tractor. In some situations, when more than one trailer is towed by a single tractor in, for example, a road train configuration, multiple trailers (e.g., trailer cameras) must be associated with the proper tractor.

The present invention provides a new and improved apparatus and method which addresses the above-referenced problems.

SUMMARY

In one embodiment, a camera system on a vehicle includes an electronic control unit, a base sensor on a first portion of the vehicle, and a remote sensor on a second portion of the vehicle. The base sensor and the remote sensor communicate with the electronic control unit. The electronic control unit associates the remote sensor with the base sensor based on respective signals received from the base sensor and the remote sensor representing respective measurements of a first physical quantity by the base sensor and the remote sensor.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
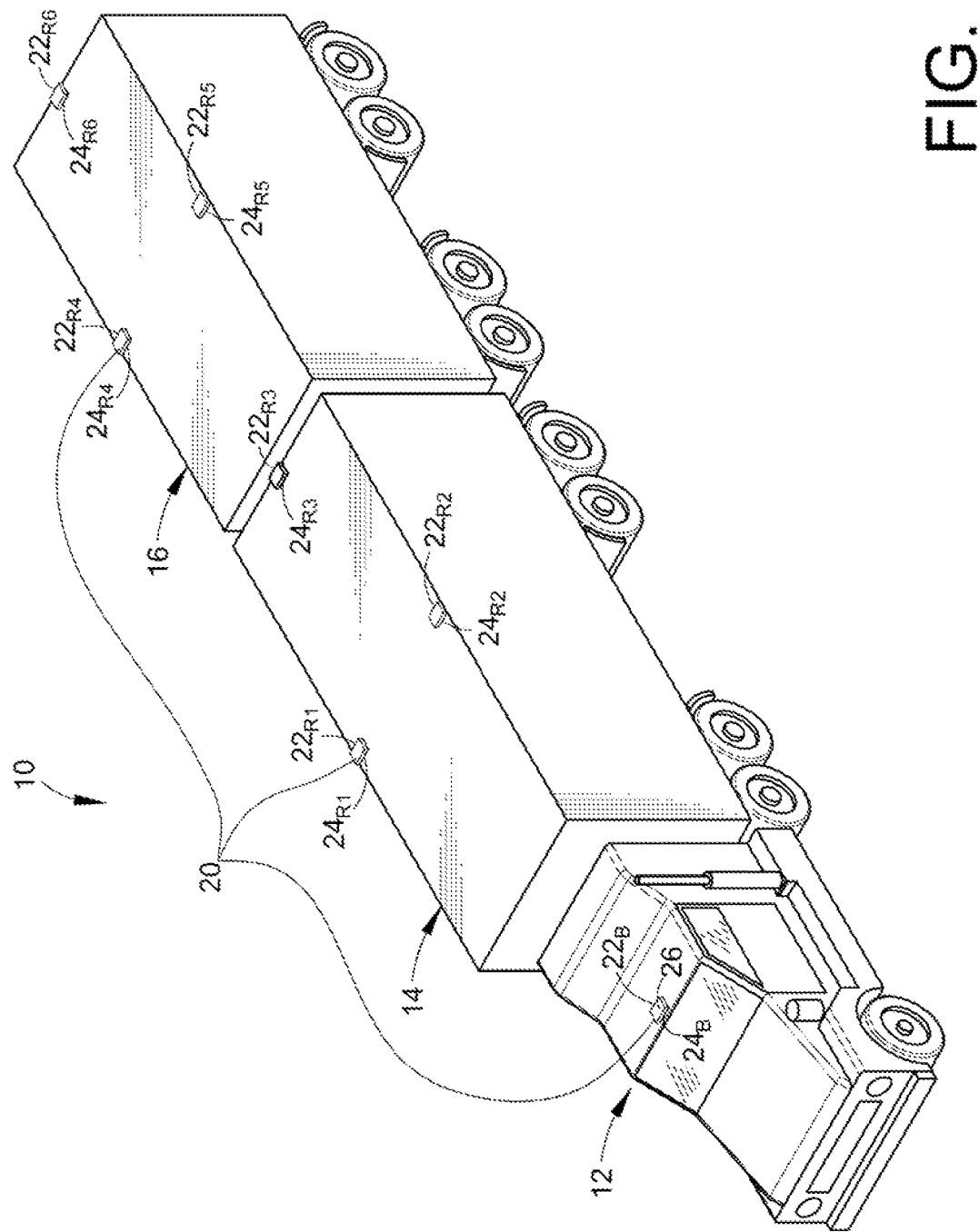
FIG. 1 illustrates a schematic representation of a heavy vehicle including a camera system in accordance with one embodiment of an apparatus illustrating principles of the present invention.

With reference to FIG. 1, a perspective view of a heavy vehicle 10 such as, for example, an articulated truck in accordance with one embodiment of the present invention. The articulated vehicle 10 includes a first portion 12, a second portion 14, and a third portion 16. In the illustrated embodiment, the first portion 12 of the articulated vehicle 10 is a towing portion (e.g., a tractor), the second portion 14 of the articulated vehicle 10 is a first towed portion (e.g., a first trailer), and the third portion 16 of the articulated vehicle 10 is a second towed portion (e.g., a second trailer). Although two (2) towed portions (e.g., two (2) trailers) are illustrated, it is to be understood that any number of towed portions (e.g., trailers) are contemplated. For example, embodiments of the present invention may be practiced on heavy vehicles including only one (1) towed portion, more than two (2) towed portions, or even no towed portions (e.g., a straight truck).

A camera system 20 is included on the vehicle 10. The camera system 20 includes a plurality of cameras 22 around the vehicle 10. For example, the first portion 12 (e.g., tractor) of the vehicle 10 may optionally include a base camera $22_B$ (e.g., a base camera). The second portion 14 (e.g., first trailer) of the vehicle 10 may include three (3) remote cameras $22_{R1,R2,R3}$ (e.g., remote cameras), and the third portion 16 (e.g., second trailer) of the vehicle 10 may include three (3) remote cameras $22_{R4,R5,R6}$ (e.g., remote cameras). The first and second trailers 14, 16 both include one camera $22_{R1,R2,R4,R5}$ on each side and one camera $22_{R3,R6}$ on the rear. All of the cameras $22_{B,R1-R6}$ (collectively 22) together may be used to create a view substantially surrounding (e.g., a Surround View) the vehicle 10 as part of the camera system 20.

Each of the cameras $22_{B,R1-R6}$ includes a respective associated sensor $24_{B,R1-R6}$ (collectively 24). In one embodiment, it is contemplated that the sensors 24 are incorporated into (e.g., integral with) the respective cameras 22. Alternatively, the sensors 24 are separate from the respective cameras 22. Regardless of whether the sensors 24 are integral with, or separate from, the respective cameras 22, each of the sensors 24 electrically communicates with the respective camera 22. Although the base camera $22_B$ is noted above as optional, the base sensor $24_B$ is included. If the camera $22_B$ is included, the sensor $24_B$ electrically communicates with the camera $22_B$. Similarly, the sensor $24_{R1}$ electrically communicates with the camera $22_{R1}$, the sensor $24_p$ electrically communicates with the camera $22_{R2}$, the sensor $24_{R3}$ electrically communicates with the camera $22_{R3}$, the sensor $24_{R4}$ electrically communicates with the camera $22_{R4}$, the sensor $24_{R5}$ electrically communicates with the camera $22_{R5}$, and the sensor $24_{R6}$ electrically communicates with the camera $22_{R6}$. Like the cameras 22, any of the sensors $24_B$ on the tractor 12 are referred to as base sensors, while any of the sensors $24_{R1-R6}$ on any of the trailers 14, 16 are referred to as remote sensors.

The camera system 20 also includes a electronic control unit (ECU) 26. In the illustrated embodiment, the ECU 26 is located on the tractor portion 12 of the vehicle 10. It is contemplated that the ECU 26 may be one that already typically exists on heavy vehicles such as, for example, an antilock braking system (ABS) ECU, an electronic stability program ECU, electronic braking system (EBS) ECU, etc., or, alternatively, a separate ECU for the camera system 20. In one embodiment, the base sensor $24_B$ and the optional base camera $22_B$ are part of (e.g., integral with), or substantially adjacent to, the ECU 26.

Each of the sensors 24 communicates with the ECU 26. Although it is possible that each of the sensors 24 communicates with the ECU 26 via a wired connection, it is contemplated that at least the remote sensors $24_{R1-R6}$ on the trailers 14, 16 wirelessly communicate with the ECU 26 via radio-frequency (RF) signals. Any of the base sensors $24_B$ may also communicate with the ECU 26 via a wired connection or wirelessly via RF signals. Whether the individual sensors 24 communicate with the ECU 26 via a wired or wireless connection, the sensors 24 are said to electrically communicate with the ECU 26.

As discussed above, articulated trucks, such as the vehicle 10, typically include a tractor 12 that can easily couple to, and decouple from, different trailers 14, 16.

Figure 2:
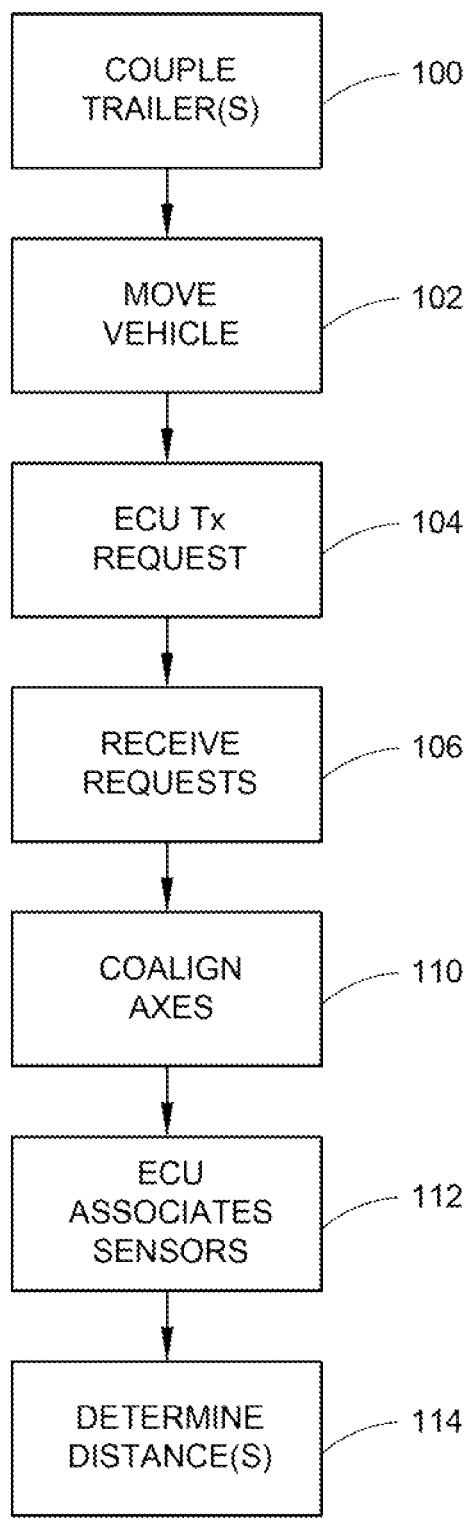
FIG. 2 is an exemplary methodology of associating sensors and cameras in a camera systems in accordance with one embodiment illustrating principles of the present invention.

FIG. 2 illustrates an exemplary methodology for associating the remote sensors $24_{R1-R6}$ (and their associated cameras $22_{R1-R6}$) with the ECU 26 and/or the base sensor $24_B$. Since the base sensor $24_B$ (and its associated camera $22_B$) and the ECU 26 are both on the tractor 12, it is assumed the base sensor $24_B$ (and its associated camera $22_B$) were previously associated with the ECU 26. Therefore, once any of the remote sensors $24_{B1-B6}$ is associated with the ECU 26, the same remote sensor(s) $24_{B1-B6}$ are associated with the base sensor $24_B$. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, at least one of the trailers 14, 16 is coupled to the tractor 12 in a step 100. In the illustrated embodiment, the first trailer 14 is coupled to the tractor 12, and the second trailer 16 is coupled to the first trailer 14. Therefore, the tractor 12, the first trailer 14, and the second trailer 16 form a road train configuration.

After the at least one of the trailers 14, 16 is coupled to the tractor 12, the vehicle 10 begins to move in a step 102. Once the vehicle 10 begins moving, the ECU 26 transmits a request signal, in a step 104. The request signal is intended to cause each of the sensors 24 to begin transmitting data signals. The request signal is received by each of the sensors 24 in a step 106.

Each of the sensors 24 responds similarly after receiving the request signal from the ECU 26. Therefore, a general description regarding the sensors 24 is provided. Once a sensor 24 receives the request signal, the sensor 24 optionally confirms, in a step 110, the horizontal axes (x,y) and vertical axis (z) are collinear with the other sensors. More specifically, in the step 110, the sensor confirms the vertical axis (z) is aligned with a gravity vector. Once the vertical axis (z) is aligned with a gravity vector, the horizontal axes (x,y) are assumed to be aligned, since the horizontal axes (x,y) are orthogonal to each other and the vertical axis (z). Optionally, the magnitude of the acceleration orthogonal to the direction of gravity may be taken as the total (e.g., not downward) acceleration acting on each sensor.

As discussed in more detail below, the remote sensors $24_{R1-R6}$ (and their associated cameras $22_{R1-R6}$) are associated with the ECU 26, in a step 112. In other words, the ECU 26 associates the remote sensors $24_{R1-R6}$ with the tractor 12 of the vehicle 10. Furthermore, respective distances between the base sensor $24_B$ and each of the remote sensors $24_{R1-R6}$ are determined in a step 114.

Figure 3:
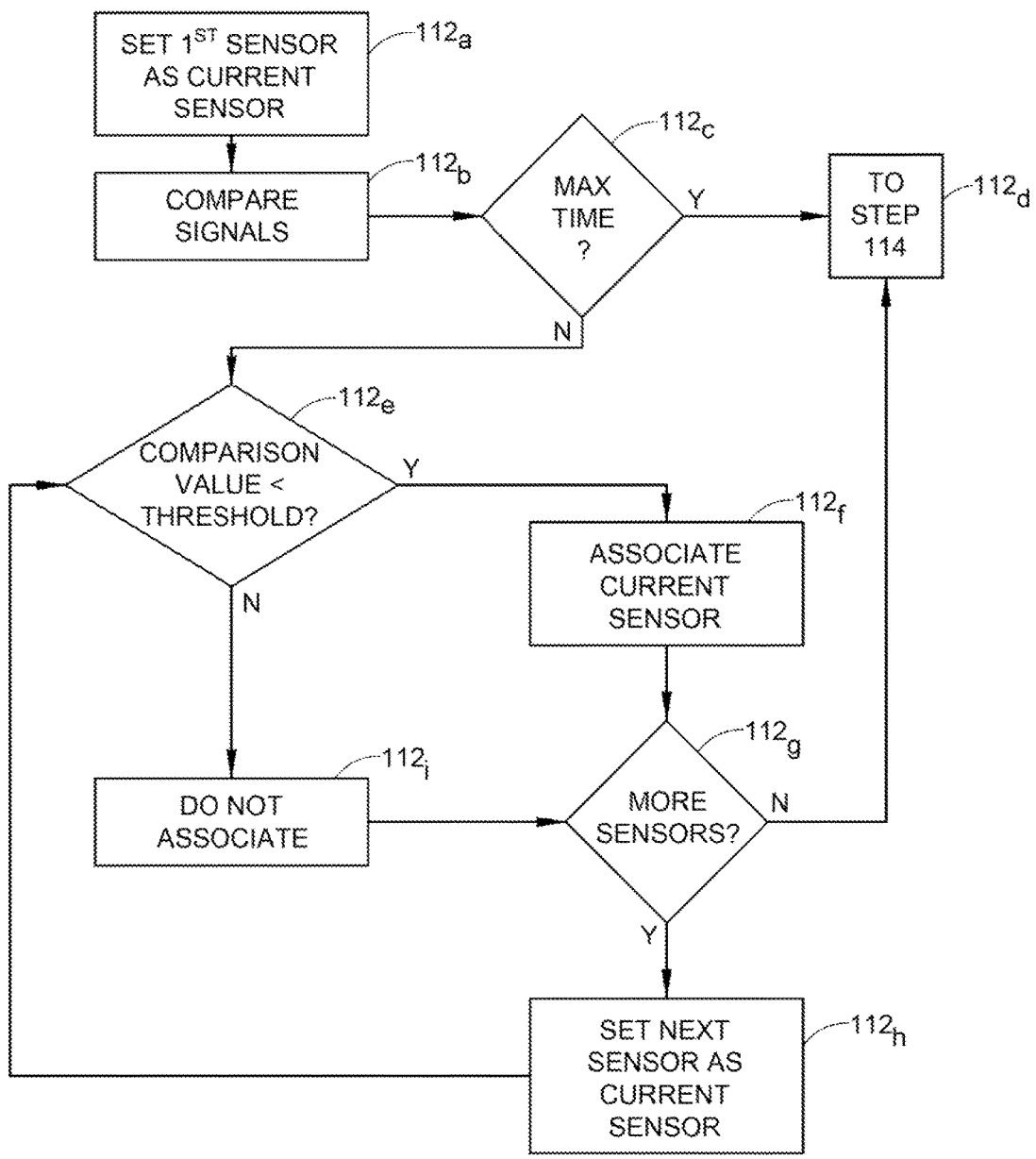
FIG. 3 is an exemplary methodology of associating sensors in accordance with one embodiment illustrating principles of the present invention.

FIG. 3 illustrates a first embodiment of an exemplary methodology of the step 112 for associating the remote sensors $24_{R1-R6}$ (and their associated cameras $22_{R1-R6}$) (see FIG. 1) with the ECU 26 (see FIG. 1) (e.g., with the tractor 12 of the vehicle 10). As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

Figure 4A:
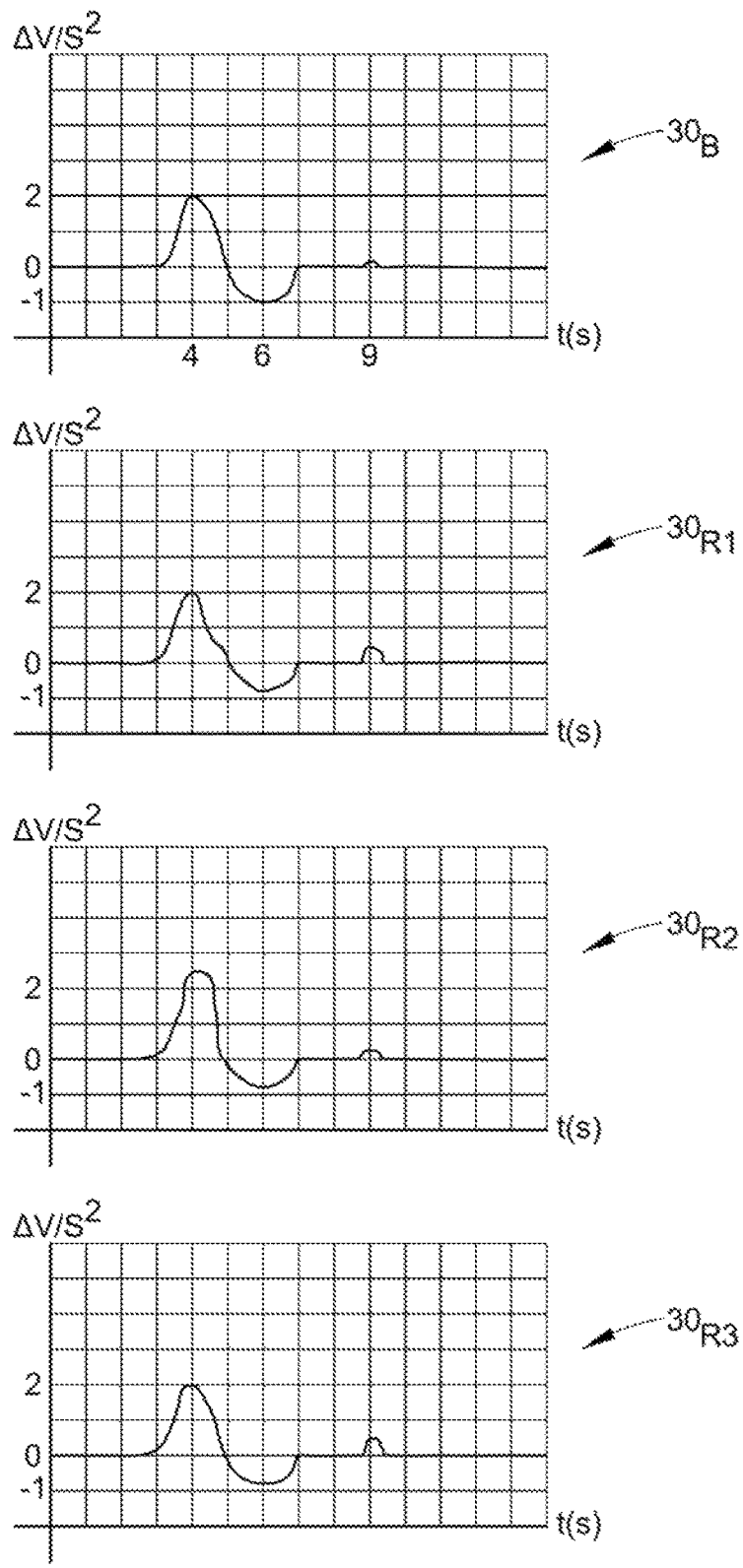
FIGS. 4a and 4b illustrate graphical representations of acceleration in accordance with one embodiment of an apparatus illustrating principles of the present invention.
Figure 4B:
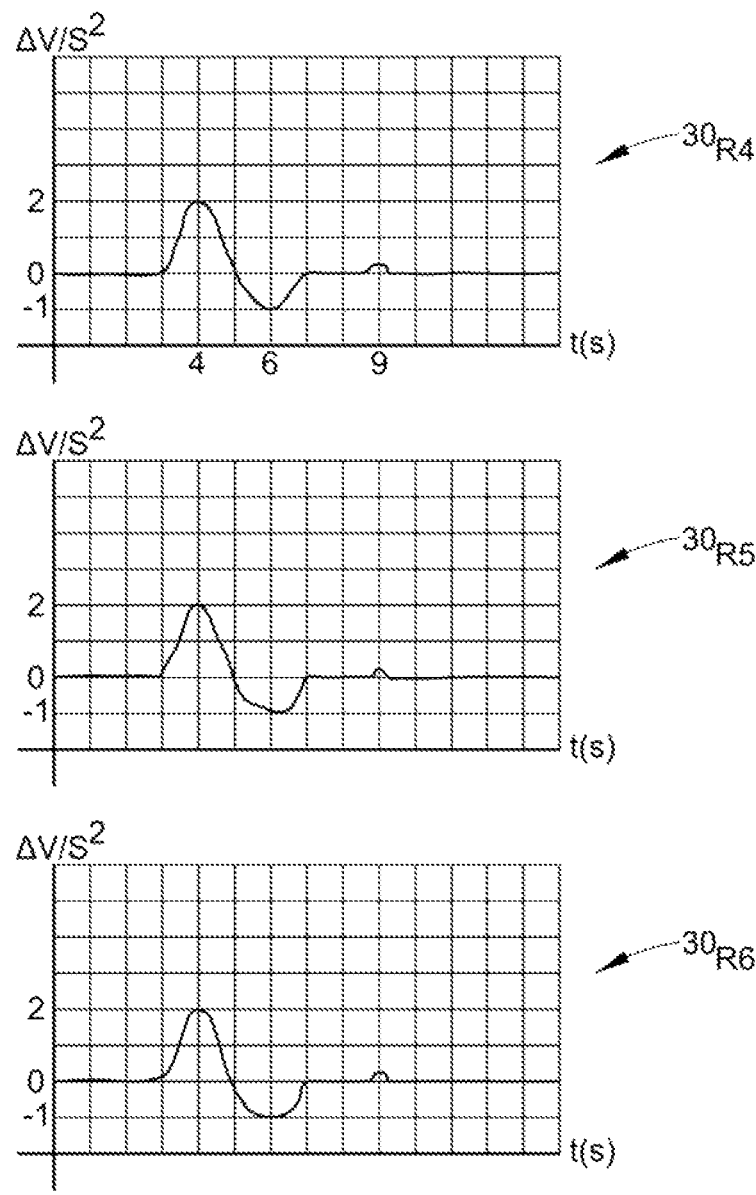

FIGS. 4a and 4b illustrate graphs $30_{B,R1-R6}$ showing a first (horizontal) physical quantity (e.g., horizontal acceleration (i.e., Δvelocity/time (Δv/t))) vs. time (t)), respectively, for each of the sensors $24_{B,R1-R6}$ (see FIG. 1). The horizontal acceleration is also referred to as longitudinal acceleration (e.g., a longitudinal physical quantity). Therefore, it is contemplated that in one embodiment, the sensors $24_{B,R1-R6}$ (see FIG. 1) are accelerometers.

With reference to FIGS. 1, 3, 4a and 4b, respective graphs $30_{B,R1-R6}$ are illustrated representing the signals received by the ECU 26 from the base sensor $24_B$ and the remote sensors $24_{R1-R6}$ that indicate horizontal acceleration of the base sensor $24_B$ and the remote sensors $24_{R1-R6}$. More specifically, the signals received from the base sensor $24_B$ and illustrated as the graph $30_B$ represent acceleration of the base sensor $24_B$ and, correspondingly, the first portion (tractor) 12 of the vehicle 10. The signals received from the remote sensors $24_{R1,R2,R3}$ and illustrated as the graphs $30_{R1,R2,R3}$ represent acceleration of the remote sensors $24_{R1,R2,R3}$ and, correspondingly, the second portion (first trailer) 14 of the vehicle 10. The signals received from the remote sensors $24_{R4,R5,R6}$ and illustrated as the graphs $30_{R4,R5,R6}$ represent acceleration of the remote sensors $24_{R4,R5,R6}$ and, correspondingly, the third portion (second trailer) 16 of the vehicle 10.

A current remote sensor $24_{Cur}$ is identified in a step 112a as one of the remote sensors $24_{R1-R6}$ (e.g., the remote sensor $24_{R1}$). The signals between the base sensor $24_B$ and the current remote sensor $24_{Cur}$ at each of the time intervals (e.g., at every 1 second) are compared in a step 112b. For example, average comparison acceleration values are determined between the base sensor $24_B$ and the current remote sensor $24_{Cur}$ at each of the time intervals (e.g., at each second) in the step 112b. In a step 112c, a determination is made whether a maximum time (e.g., ten (10) seconds) has been reached. If the maximum time has been reached, control passes to a step 112d for returning to the step 114. Otherwise, if the maximum time has not been reached, control passes to a step 112e, which is discussed in more detail below.

A determination of the average comparison acceleration value of the first remote sensor $24_{R1}$ (see graph 300 is described here. It is to be understood that the average comparison acceleration values of the other remote sensors $24_{R2-R6}$ (see graphs $30_{R2-R6}$) are determined in a similar manner when those respective remote sensors $24_{R2-R6}$ (see graphs $30_{R2-R6}$) are the current remote sensor. The average comparison acceleration value of the current remote sensor $24_{Cur}$ (e.g., the first remote sensor $24_{R1}$ (see graph $30_{R1}$)) is determined by adding absolute values of respective individual differences between the accelerations of the base sensor $24_B$ ($30_B$) and the current remote sensor $24_{Cur}$ (e.g., the first remote sensor $24_{R1}$ ($30_{R1}$)) at predetermined time intervals (e.g., at each second) over a period of time (e.g., ten (10) seconds) before dividing that sum of the absolute values by the number of predetermined time intervals. Therefore, the average comparison acceleration value is an average of the absolute values of the acceleration differences between the base sensor $24_B$ and the current remote sensor $24_{Cur}$ (e.g., the first remote sensor $24_{R1}$) at each of the time intervals (e.g., at each of the ten (10) one (1) second time intervals). For example, for the base sensor $24_B$ at the time of one (1) second, the acceleration is zero (0); at the time of two (2) seconds, the acceleration is zero (0); at the time of three (3) seconds, the acceleration is zero (0); at the time of four (4) seconds, the acceleration is two (2) m/s²; at the time of five (5) seconds, the acceleration is zero (0); at the time of six (6) seconds, the acceleration is −1 m/s²; at the time of seven (7) seconds, the acceleration is zero (0); at the time of eight (8) seconds, the acceleration is zero (0); at the time of nine (9) seconds, the acceleration is 0.25 m/s²; and at the time of ten (10) seconds, the acceleration is zero (0).

For the current remote sensor $24_{Cur}$ (e.g., the first remote sensor $24_{R1}$ ($30_{R1}$)) at the time of one (1) second, the acceleration is zero (0); at the time of two (2) seconds, the acceleration is zero (0); at the time of three (3) seconds, the acceleration is zero (0); at the time of four (4) seconds, the acceleration is 1.9 m/s²; at the time of five (5) seconds, the acceleration is zero (0); at the time of six (6) seconds, the acceleration is −0.8 m/s²; at the time of seven (7) seconds, the acceleration is zero (0); at the time of eight (8) seconds, the acceleration is zero (0); at the time of nine (9) seconds, the acceleration is 0.40 m/s²; and at the time of ten (10) seconds, the acceleration is zero (0). Therefore, the average comparison acceleration value is determined as (|0 m/s²−0 m/s²|[at 1 second]+|0 m/s²−0 m/s²|[at 2 seconds]+|0 m/s²−0 m/s²|[at 3 seconds]+|2.0 m/s²−1.9 m/s²|[at 4 seconds]+|0 m/s²−0 m/s²|[at 5 seconds]+|−1.0 m/s²+0.8 m/s²)|[at 6 seconds]+|0 m/s²−0 m/s²|[at 7 seconds]+|0 m/s²−0 m/s²|[at 8 seconds]+|0.25 m/s²−0.4 m/s²|[at 9 seconds]+|0 m/s²−0 m/s²|[at 10 seconds])/10=0.45 m/s²/10=0.045 m/s².

As discussed below, during a subsequent iteration (e.g., when the second remote sensor $24_{R2}$ ($30_{R2}$) is the current remote sensor $24_{Curr}$), similar calculations are performed for the base sensor $24_B$ ($30_B$) and the second remote sensor $24_{R2}$ ($30_{R2}$). The second remote sensor $24_{R2}$ ($30_{R2}$) includes accelerations of 2.4 m/s² at 4 seconds, −0.6 m/s² at 6 seconds, and 0.25 m/s² at 9 seconds. Zero (0) acceleration is assumed at the other times of 1-3, 5, 7, 8, and 10 seconds. Therefore, the average comparison acceleration value for the base sensor $24_B$ ($30_B$) and the second remote sensor $24_{R2}$ ($30_{R2}$) is determined as (|0 m/s²−0 m/s²|[at 1 second]+|0 m/s²−0 m/s²|[at 2 seconds]+|0 m/s²−0 m/s²|[at 3 seconds]+ |2.0 m/s²−2.4 m/s²|[at 4 seconds]+|0 m/s²−0 m/s²|[at 5 seconds]+|−1.0 m/s²−(−0.6 m/s²)|[at 6 seconds]+|0 m/s²−0 m/s²|[at 7 seconds]+|0 m/s²−0 m/s²|[at 8 seconds]+|0.25 m/s²−0.25 m/s²|[at 9 seconds]+|0 m/s²−0 m/s²|[at 10 seconds])/10=0.08 m/s².

As discussed below, during a subsequent iteration (e.g., when the third remote sensor $24_{R3}$ ($30_{R3}$) is the current remote sensor $24_{Cur}$), similar calculations are performed for the base sensor $24_B$ ($30_B$) and the third remote sensor $24_{R3}$ ($30_{R3}$). The third remote sensor $24_{R3}$ ($30_{R3}$) includes accelerations of 2.0 m/s² at 4 seconds, −0.9 m/s² at 6 seconds, and 0.4 m/s² at 9 seconds. Zero (0) acceleration is assumed at the other times of 1-3, 5, 7, 8, and 10 seconds. Therefore, the average comparison acceleration value for the base sensor $24_B$ ($30_B$) and the third remote sensor $24_{R3}$ ($30_{R3}$) is determined as (|0 m/s²−0 m/s²|[at 1 second]+|0 m/s²−0 m/s²|[at 2 seconds]+|0 m/s²−0 m/s²|[at 3 seconds]+|2.0 m/s²−2.0 m/s²|[at 4 seconds]+|0 m/s²−0 m/s²|[at 5 seconds]+|−1.0 m/s²−(−0.9 m/s²)|[at 6 seconds]+|0 m/s²−0 m/s²|[at 7 seconds]+|0 m/s²−0 m/s²|[at 8 seconds]+|0.25 m/s²−0.4 m/s²|[at 9 seconds]+|0 m/s²−0 m/s²|[at 10 seconds])/10=0.025 m/s².

As discussed below, during a subsequent iteration (e.g., when the fourth remote sensor $24_{R4}$ ($30_{R4}$) is the current remote sensor $24_{Curr}$), similar calculations are performed for the base sensor $24_B$ ($30_B$) and the fourth remote sensor $24_{R4}$ ($30_{R4}$). The fourth remote sensor $24_{R4}$ ($30_{R4}$) includes accelerations of 2.0 m/s² at 4 seconds, −1.0 m/s² at 6 seconds, and 0.25 m/s² at 9 seconds. Zero (0) acceleration is assumed at the other times of 1-3, 5, 7, 8, and 10 seconds. Therefore, the average comparison acceleration value for the base sensor $24_B$ ($30_B$) and the fourth remote sensor $24_{R4}$ ($30_{R4}$) is determined as (|0 m/s²−0 m/s²|[at 1 second]+|0 m/s²−0 m/s²|[at 2 seconds]+|0 m/s²−0 m/s²|[at 3 seconds]+|2.0 m/s²−2.0 m/s²|[at 4 seconds]+|0 m/s²−0 m/s²|[at 5 seconds]+|−1.0 m/s²−(−1.0 m/s²)|[at 6 seconds]+|0 m/s²−0 m/s²|[at 7 seconds]+|0 m/s²−0 m/s²|[at 8 seconds]+|0.25 m/s²−0.25 m/s²|[at 9 seconds]+|0 m/s²−0 m/s²|[at 10 seconds])/10=0 m/s².

As discussed below, during a subsequent iteration (e.g., when the fifth remote sensor $24_{R5}$ ($30_{R5}$) is the current remote sensor $24_{Curr}$), similar calculations are performed for the base sensor $24_B$ ($30_B$) and the fifth remote sensor $24_{R5}$ ($30_{R5}$). The fifth remote sensor $24_{R5}$ ($30_{R5}$) includes accelerations of 2.0 m/s² at 4 seconds, −1.0 m/s² at 6 seconds, and 0.25 m/s² at 9 seconds. Zero (0) acceleration is assumed at the other times of 1-3, 5, 7, 8, and 10 seconds. Therefore, the average comparison acceleration value for the base sensor $24_B$ ($30_B$) and the fifth remote sensor $24_{R5}$ ($30_{R5}$) is determined as (|0 m/s²−0 m/s²|[at 1 second]+|0 m/s²−0 m/s²|[at 2 seconds]+|0 m/s²−0 m/s²|[at 3 seconds]+|2.0 m/s²−2.0 m/s²|[at 4 seconds]+|0 m/s²−0 m/s²|[at 5 seconds]+|−1.0 m/s²−(−1.0 m/s²)|[at 6 seconds]+(0 m/s²−0 m/s²) [at 7 seconds]+(0 m/s²−0 m/s²)[at 8 seconds]+(0.25 m/s²−0.25 m/s²)[at 9 seconds]+(0 m/s²−0 m/s²)[at 10 seconds])/10=0 m/s².

As discussed below, during a subsequent iteration (e.g., when the sixth remote sensor $24_{R6}$ ($30_{R6}$) is the current remote sensor $24_{Curr}$), similar calculations are performed for the base sensor $24_B$ ($30_B$) and the sixth remote sensor $24_{R6}$ ($30_{R6}$). The sixth remote sensor $24_{R6}$ ($30_{R6}$) includes accelerations of 2.0 m/s² at 4 seconds, −1.0 m/s² at 6 seconds, and 0.25 m/s² at 9 seconds. Zero (0) acceleration is assumed at the other times of 1-3, 5, 7, 8, and 10 seconds. Therefore, the average comparison acceleration value for the base sensor $24_B$ ($30_B$) and the sixth remote sensor $24_{R6}$ ($30_{R6}$) is determined as (|0 m/s²−0 m/s²|[at 1 second]+|0 m/s²−0 m/s²|[at 2 seconds]+|0 m/s²−0 m/s²|[at 3 seconds]+|2.0 m/s²−2.0 m/s²|[at 4 seconds]+|0 m/s²−0 m/s²|[at 5 seconds]+|−1.0 m/s²−(−1.0 m/s²)|[at 6 seconds]+(0 m/s²−0 m/s²) [at 7 seconds]+(0 m/s²−0 m/s²)[at 8 seconds]+(0.25 m/s²−0.25 m/s²)[at 9 seconds]+(0 m/s²−0 m/s²)[at 10 seconds])/10=0 m/s².

For the purposes of discussion, it is assumed again that the first remote sensor $24_{R1}$ ($30_{R1}$) is the current remote sensor $24_{Curr}$.

In the step 112e, a determination is made whether the average comparison acceleration value is less than a predetermined average comparison threshold value (e.g., 1 m/s²). If the average comparison acceleration value is less than the predetermined average comparison threshold, control passes to a step 112f for associating the current remote sensor $24_{Curr}$ with the ECU 26. A determination is then made in a step 112g if additional remote sensors $24_{R2-R6}$ have not yet been evaluated. If any of the remote sensors $24_{R2-R6}$ has not yet been evaluated, the next remote sensor $24_{R2-R6}$ is set as the current remote sensor $24_{Curr}$ in a step 112h. Control then returns to the step 112b. If, on the other hand, all of the remote sensors $24_{R2-R6}$ have been evaluated, control passes to the step 112d for returning to the step 114.

If, in the step 112e, the average comparison acceleration value is not less than the predetermined average comparison threshold, control passes to a step 112i for indicating that the current remote sensor $24_{Curr}$ should not be associated with the ECU 26. Control then passes to the step 112g to determine if any additional remote sensors $24_{R2-R6}$ have not yet been evaluated.

The methodology described above provides one opportunity for deciding whether to associate (e.g., couple) the remote sensor(s) $24_{R1-R6}$ with the ECU 26. Perhaps, because of noise caused by one or more of the remote sensor(s) $24_{R1-R6}$ is hanging on a loose and/or vibrating part of the vehicle, one or more of the remote sensor(s) $24_{R1-R6}$ will not properly couple with the ECU 26. It is contemplated that such issues can be addressed by smaller (e.g., finer) predetermined time intervals. More specifically, instead of using predetermined time intervals of one (1) second during the time period of ten (10) seconds, smaller (e.g., finer) predetermined time intervals (e.g., 0.1 second) may be used. If at least a predetermined number of the respective average comparison acceleration values of the ten (10) respective 0.1 second intervals of each second are less than a predetermined average finer threshold value (e.g., 1 m/s²), the second associated with the ten (10) 0.1 second intervals is considered in the step 112e as having a comparison acceleration value less than the predetermined average comparison threshold. On the other hand, if at least a predetermined number of the respective average comparison acceleration values of the ten (10) respective 0.1 second intervals of each second are not less than the predetermined average finer threshold value, the second associated with the ten (10) 0.1 second intervals is considered in the step 112e as not having a comparison acceleration value less than the predetermined individual comparison threshold.

Figure 5:
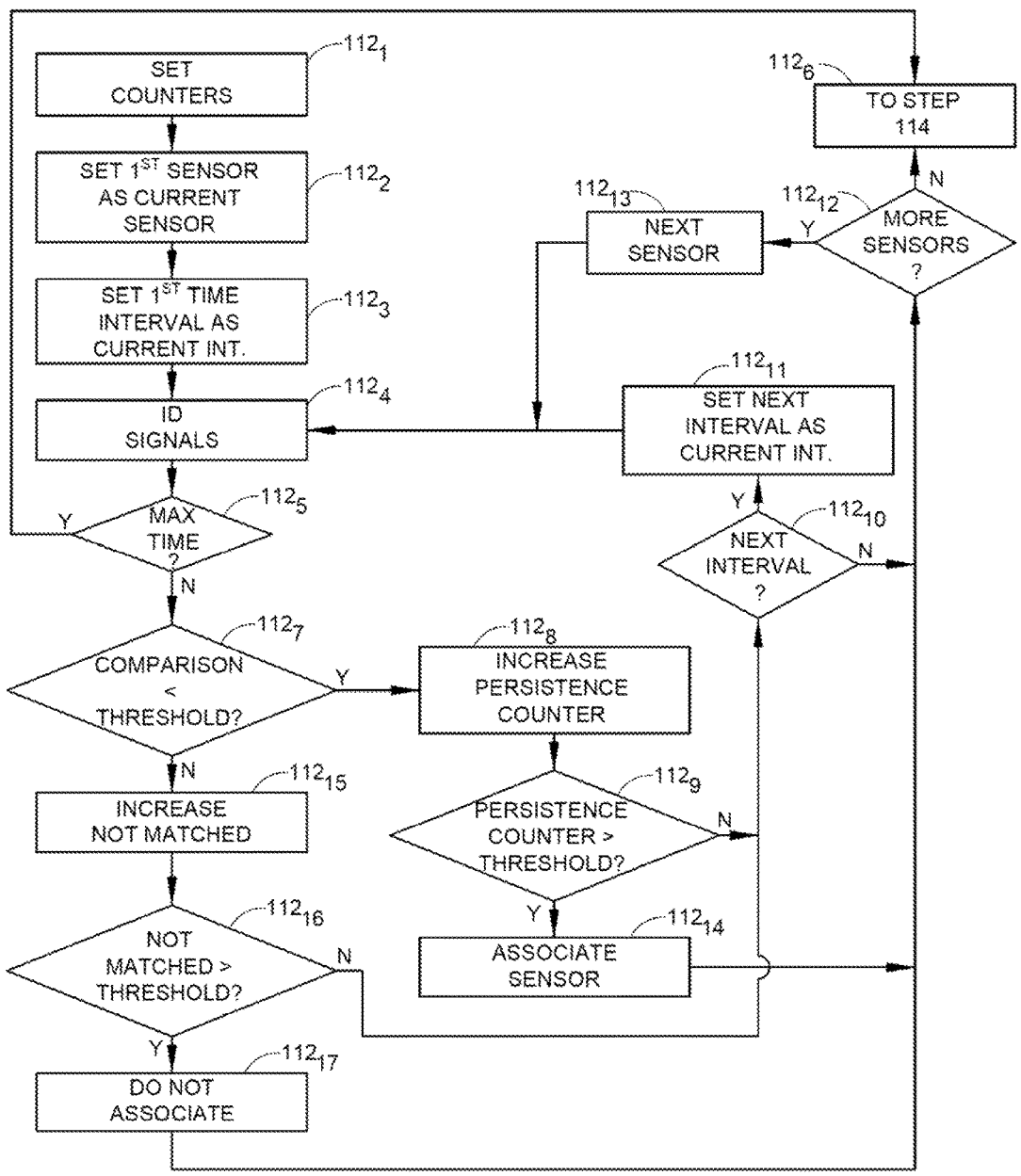
FIG. 5 is an exemplary methodology of associating sensors in accordance with another embodiment illustrating principles of the present invention.

FIG. 5 illustrates a second embodiment of an exemplary methodology of the step 112 for associating the remote sensors $24_{R1-R6}$ (and their associated cameras $22_{R1-R6}$) (see FIG. 1) with the ECU 26 (see FIG. 1) (e.g., with the tractor 12 of the vehicle 10). As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1, 4a and 4b and 5, counters are set in a step $112_1$. More specifically, a persistence counter and a "not matched" counter are both set to zero (0) in the step $112_1$. A current remote sensor $24_{Cur}$ is identified in a step $112_2$ as one of the remote sensors $24_{R1-R6}$ (e.g., the remote sensor $24_{R1}$). A current time interval is set as one of the time intervals (e.g., the first time interval at one (1) second) in a step $112_3$. The signals between the base sensor $24_B$ and the current remote sensor $24_{Cur}$ at the current time interval is identified in a step $112_4$. In a step $112_5$, a determination is made whether a maximum time (e.g., ten (10) seconds) has been reached. If the maximum time has been reached, control passes to a step $112_6$ for returning to the step 114. Otherwise, if the maximum time has not been reached, control passes to a step $112_7$.

In the step $112_7$, a determination is made whether an individual comparison acceleration value for the current time interval (e.g., |0 m/s²−0 m/s²|[at 1 second] when the current remote sensor $24_{Cur}$ is the first remote sensor $24_{R1}$) is less than a predetermined individual comparison threshold value (e.g., 1 m/s²). If the individual comparison acceleration value is less than the predetermined individual comparison threshold, control passes to a step $112_8$ for increasing the persistence counter by, for example, one (1). A determination is then made in a step $112_9$ whether the persistence counter is greater than a persistence counter threshold (e.g., seven (7), which would represent 70% if there are ten (10) time intervals). If the persistence counter is not greater than the persistence counter threshold, control passes to a step $112_{10}$ for determining if a next time interval is available to evaluate. If a next time interval is available, control passes to a step $112_{11}$ for setting the current time interval to the next time interval (e.g., to the second time interval) before returning to the step $112_4$. Otherwise, if all of the time intervals for the current sensor $24_{Cur}$ have been evaluated, control passes to a step $112_{12}$ for determining if all of the remote sensors $24_{R1-R6}$ have been evaluated. If all of the remote sensors $24_{R1-R6}$ have not yet been evaluated, control passes to a step $112_{13}$ for setting the next one of the remote sensors $24_{R1-R6}$ as the current sensor $24_{Curr}$. Otherwise, if all of the remote sensors $24_{R1-R6}$ have been evaluated, control passes to the step $112_6$.

If it is determined in the step $112_9$ that the persistence counter is greater than the persistence counter threshold, the current remote sensor $24_{Curr}$ is associated with the ECU 26 in a step $112_{14}$ before passing to the step $112_{12}$ to determine if additional sensors are available to evaluate.

If it is determined in the step $112_7$ that the individual comparison acceleration value for the current time interval is not less than a predetermined individual comparison threshold value, control passes to a step $112_{15}$ to increase the "not matched" counter by, for example, one (1). A decision is then made in a step $112_{16}$ whether the "not matched" counter is greater than a "not matched" counter threshold (e.g., seven (7)). If the "not matched" counter is not greater than the "not matched" counter threshold, control passes to the step $112_{10}$ for determining if additional time intervals are available. Otherwise, if the "not matched" counter is greater than the "not matched" counter threshold, a decision is made in a step $112_{17}$ to not associate the remote sensors $24_{R1-R6}$ with the ECU 26 before passing to the step $112_{12}$ for determining if additional remote sensors $24_{R1-R6}$ are available.

The methodology described above provides one opportunity for deciding whether to associate (e.g., couple) the remote sensor(s) $24_{R1-R6}$ with the ECU 26. Perhaps, because of noise caused by one or more of the remote sensor(s) $24_{R1-R6}$ is hanging on a loose and/or vibrating part of the vehicle, one or more of the remote sensor(s) $24_{R1-R6}$ will not properly couple with the ECU 26. It is contemplated that such issues can be addressed by smaller (e.g., finer) predetermined time intervals. More specifically, instead of using predetermined time intervals of one (1) second during the time period of ten (10) seconds, smaller (e.g., finer) predetermined time intervals (e.g., 0.1 second) may be used. If at least a predetermined number of the respective individual comparison acceleration values of the ten (10) respective 0.1 second intervals of each second are less than a predetermined individual finer threshold value (e.g., 1 m/s²), the second associated with the ten (10) 0.1 second intervals is considered in the step $112_7$ as having a comparison acceleration value less than the predetermined individual comparison threshold. On the other hand, if at least a predetermined number of the respective individual comparison acceleration values of the ten (10) respective 0.1 second intervals of each second are not less than the predetermined individual finer threshold value, the second associated with the ten (10) 0.1 second intervals is considered in the step $112_7$ as not having a comparison acceleration value less than the predetermined individual comparison threshold.

Figure 6:
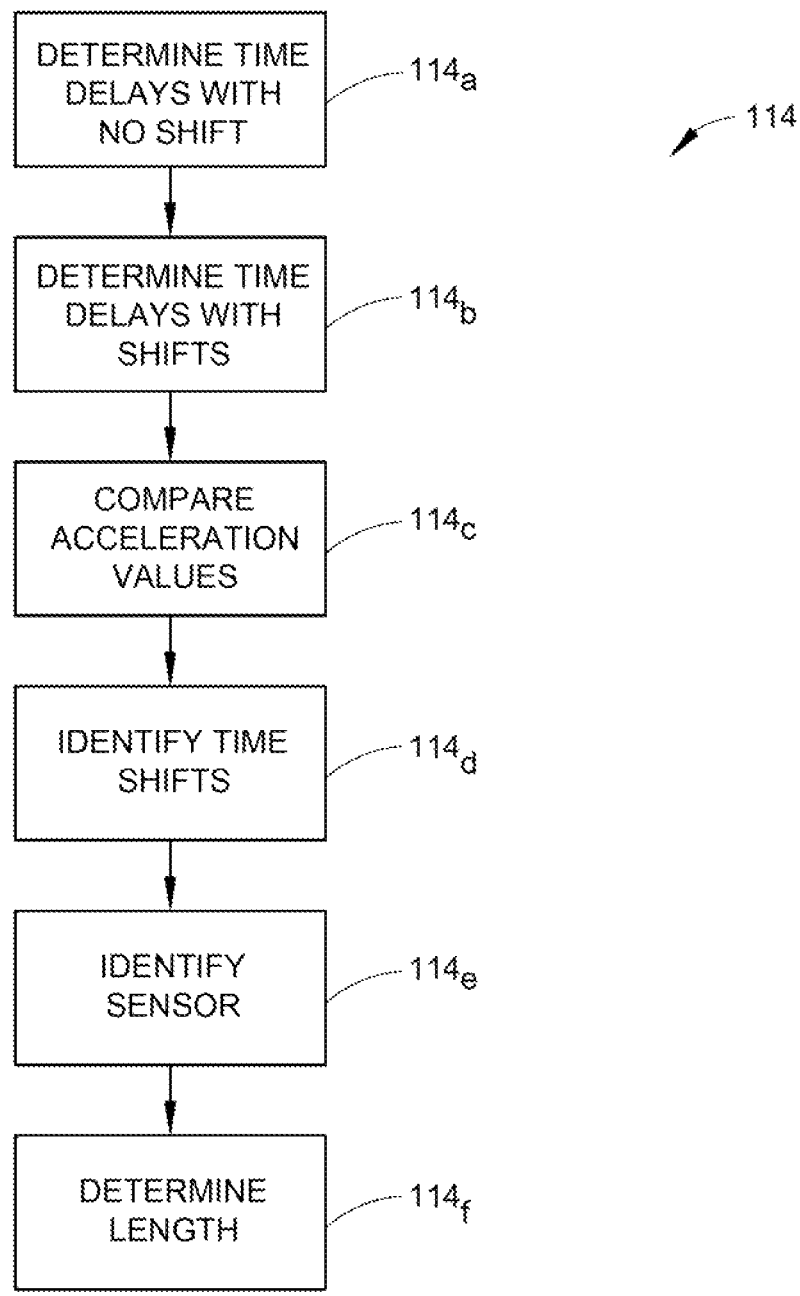
FIG. 6 is an exemplary methodology of determining distance between two sensors in accordance with one embodiment illustrating principles of the present invention.

FIG. 6 illustrates an exemplary methodology of the step 114 for determining respective distances between the base sensor $24_B$ (see FIG. 1) and the remote sensors $24_{R3,R6}$ (see FIG. 1). The distances between the base sensor $24_B$ and the remote sensors $24_{R3,R6}$ is selected because the remote sensors $24_{R3,R6}$ are located at the rear of the respective vehicle portions 14, 16 (see FIG. 1). As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

Figure 7:
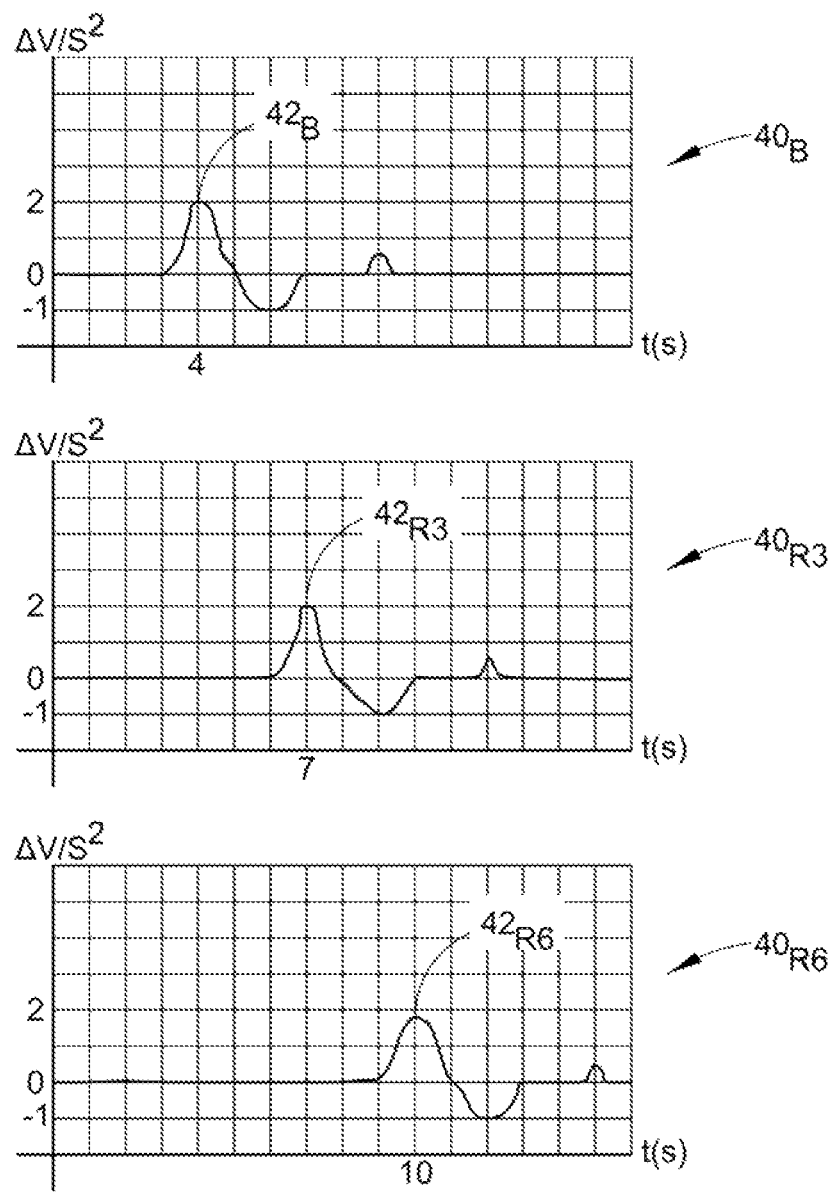
FIG. 7 illustrates graphical representations of acceleration in accordance with one embodiment of an apparatus illustrating principles of the present invention.

FIG. 7 illustrates graphs $40_{B,R3,R6}$ showing a second (vertical) physical quantity (e.g., vertical acceleration (i.e., Δvelocity/time (Δv/t)) vs. time (t)), respectively, for each of the base sensor $24_B$ on the tractor 12, the remote sensor $24_3$ on the first trailer 14, and the remote sensors $24_6$ on the second trailer 16. Vertical acceleration typically changes when the vehicle 10 goes over a bump or hill on the road surface. Because of the vehicle length, the tractor 12 will typically go over the bump first, then the first trailer portion 14 will go over the same bump, and lastly the second trailer portion 16 will go over the bump. Therefore, there is a time delay between when the various vehicle portions 12, 14, 16 go over the bump. Because of the time delays when the various vehicle portions 12, 14, 16 go over the bump, similar time delays are also evident in the vertical accelerations of the various vehicle portions 12, 14, 16. The lengths of the time delays are assume to be a function of the respective distance between the base sensor $24_B$ and the remote sensors $24_{R1-R6}$.

With reference to FIGS. 1, 6, and 7, the graphs $40_{B,R3,R6}$ show time delays between the peaks $42_{B,R3,R6}$ for analogous signals. The ECU 26 determines the time delay (e.g., shift) between the graphs by determining acceleration values for each of the graphs in a step 114a with no time shift. For example, the ECU 26 determines the acceleration value between the graphs $40_{B,R3}$ by multiplying the acceleration of the graph $40_B$ by the acceleration of the graph $40_{R3}$ at specific increments (e.g., each millisecond) over a period of time (e.g., 15 milliseconds).

The acceleration value between the graphs $40_{B,R3}$ is $(0*0)+(0*0)+(0*0)+(2*0)+(0*0)+(-1*0)+(0*2)+(0*0)+(0.5*-1)+(0*0)+(0*0)+(0*0.5)+(0*0)+(0*0)+(0*0)+(0*0)=-0.5$.

In a step 114b, the ECU 26 determines the time delay (e.g., shift) between the graphs by determining acceleration values for each of the graphs with time shifts. For example, if the graph $40_{R3}$ is time shifted 3 ms earlier (e.g., to the left), the acceleration value between the graphs $40_{B,R3}$ becomes $(0*0)+(0*0)+(0*0)+(2*2)+(0*0)+(-1*-1)+(0*0)+(0*0)+(0.5*0.5)+(0*0)+(0*0)+(0*0)+(0*0)+(0*0)+(0*0)+(0*0)=5.25$. It becomes clear that the largest acceleration value results when the graphs are time shifted to create a best overlap. As camera signals are typically sent less frequently than accelerations are measured, multiple accelerations, taken at different time instants within the camera sending interval, may be transmitted with the camera signal. The finer temporal resolution on the acceleration signals enables a finer measurement of the distance between the camera sensors. For example, camera images may be transmitted every 30 milliseconds, while acceleration may be measured every millisecond. Therefore, 30 acceleration values may be acquired and then transmitted for each camera image. Association may be established after some predetermined number (e.g., 100) of acceleration values match each other. If a number (e.g., greater than a predetermined threshold) of acceleration values persistently disagree, a timeout condition is reached and no association is established. As a consequence, the camera is not associated with the ECU (e.g., not added to the network). To summarize, persistently similar significant acceleration values (e.g., within a predetermined threshold number) lead to association and persistently different, but significant acceleration values lead to non-association.

In a step 114c, the ECU 26 compares the acceleration values between the graphs $40_{B,R3}$ for both the non-time shifted and time shifted. In a step 114d, the ECU 26 identifies the time shifts associated with the largest acceleration values. For example, it is clear that the largest acceleration values occur if the graph $40_{R3}$ is shifted 3 ms earlier (e.g., to the left) and if the graph $40_{R6}$ is shifted 6 ms earlier (e.g., to the left). More specifically, if the $40_{R3}$ is shifted 3 ms earlier (e.g., to the left) and if the graph $40_{R6}$ is shifted 6 ms earlier (e.g., to the left), the graphs $40_{B,R3,R6}$ will be substantially aligned.

In a step 114e, the ECU 26 identifies the sensor associated with the largest time shift, which will be used for determining the longest distance from the base sensor $24_B$. The longest distance from the base sensor $24_B$ is assumed to represent the distance from the base sensor $24_B$ to the rear of the vehicle 10. It is assumed the ECU 26 has been previously programmed with the distance from the base sensor $24_B$ to the front of the vehicle 10. In the present example, the largest time shift of 6 ms is associated with the remote sensor $24_6$. The total length of the vehicle 10 is then determined by adding the longest distance from the base sensor $24_B$ and the distance from the base sensor $24_B$ to the front of the vehicle 10.

Then, in a step 114f, the ECU 26 determines the length from the base sensor $24_B$ to the farthest sensor, which in the present example is the sensor $24_6$. It is assumed the ECU 26 can obtain the speed of the vehicle 10. Therefore, the ECU 26 determine the distance to the farthest sensor $24_6$ by multiplying the velocity of the vehicle 10, which is units of distance per time, by the time of the delay between the base sensor $24_B$ and the farthest sensor $24_6$, which results in a product having the units of distance.

The process described above sets forth how the electronic control unit 26 determines the distance between the base sensor $24_B$ and the remote sensor (e.g., farther remote sensor $24_6$) based on respective signals received from the base sensor $24_B$ and the remote sensor $24_6$ representing respective measurements of a second physical quantity (vertical acceleration) by the base sensor $24_B$ and the remote sensor $24_6$.

In the embodiments described above, it is to be understood that the ECU 26 includes circuitry that acts as a means for receiving base signals from the base sensor $24_B$ on the towing portion 12 of the vehicle 10. The ECU 26 also includes circuitry that acts as a means for receiving remote signals from the remote sensors $24_{R1-R6}$ on the towed portions 14, 16 of the vehicle 10. The ECU 26 also includes circuitry that acts as a means for associating the remote sensors $24_{R1-R6}$ with the base sensor $24_B$ based on respective signals received from the base sensor $24_B$ and the remote sensors $24_{R1-R6}$ representing respective measurements of a first physical quantity (e.g., horizontal acceleration) by the base sensor $24_B$ and the remote sensors $24_{R1-R6}$. The ECU 26 also includes circuitry that acts as a means for comparing the signals received from the base unit $24_B$ (e.g., base sensor) representing the measurement of the first physical quantity of the towing portion 12 of the vehicle 10 over a time period with the signals received from the remote units $24_{R1-R6}$ (e.g., remote sensors) representing the measurement of the first physical quantity of the towed portion 12 of the vehicle 10 over the time period. The ECU 26 also includes circuitry that acts as a means for associating the remote sensors $24_{R1-R6}$ with the base sensor $24_B$ based on the comparison of the signals received from the base unit $24_B$ with the signals received from the remote unit $24_{R1-R6}$ over the time period. The ECU 26 also includes circuitry that acts as a means for determining a distance between the base sensor $24_B$ and the remote sensors $24_{R1-R6}$ based on respective signals received from the base sensor $24_B$ and the remote sensors $24_{R1-R6}$ representing respective measurements of vertical accelerations of the base sensor $24_B$ and the remote sensors $24_{R1-R6}$.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A camera system on an articulated vehicle, the camera system comprising:
   an electronic control unit;
   a base camera, including a base sensor, on a first portion of the articulated vehicle, the base sensor communicating with the electronic control unit; and
   a remote camera, including a remote sensor, on a second portion of the articulated vehicle, the remote sensor communicating with the electronic control unit, the base sensor being initially uncoupled from the remote sensor, the first portion of the articulated vehicle being initially unassociated from the second portion of the articulated vehicle, and the electronic control unit coupling the remote sensor with the base sensor and configured to associate the first portion of the articulated vehicle with the second portion of the articulated vehicle based on comparisons of signals received from the base sensor and the remote sensor representing respective measurements of dynamic longitudinal accelerations of the first portion of the articulated vehicle and the second portion of the articulated vehicle over a time period, the comparisons representing sums of absolute values of differences of the respective dynamic longitudinal accelerations of the first portion and the second portion at predetermined time intervals over the period of time.

2. The camera system as set forth in claim 1, wherein:
   the electronic control unit couples the remote sensor with the base sensor and associates the first portion of the articulated vehicle with the second portion of the articulated vehicle based on the comparison of the signals received from the base sensor with the signals received from the remote sensor over the time period.

3. The camera system as set forth in claim 2, wherein:
   the signals received by the electronic control unit from the base sensor represent the measurement by the base sensor of the longitudinal acceleration of the first portion of the articulated vehicle; and
   the signals received by the electronic control unit from the remote sensor represent the measurement by the remote sensor of the longitudinal acceleration of the second portion of the articulated vehicle.

4. The camera system as set forth in claim 1, wherein:
   at least one of the base sensor and the remote sensor wirelessly communicates with the electronic control unit.

5. The camera system as set forth in claim 1, wherein:
   the base sensor is an accelerometer; and
   the remote sensor is an accelerometer.

6. An electronic control unit, comprising:
   means for receiving base signals from a base unit on a towing portion of an articulated vehicle, the base signals representing measurements of a dynamic longitudinal acceleration of the towing portion of the articulated vehicle;
   means for receiving remote signals from a remote unit on a towed portion of the articulated vehicle, the remote signals representing measurements of a dynamic longitudinal acceleration of the towed portion of the articulated vehicle, the base unit being initially uncoupled from the remote unit and the towing portion of the articulated vehicle initially being unassociated from the towed portion of the articulated vehicle;
   means for comparing the signals received from the base unit representing a sum of absolute values of differences of the measurement of the dynamic longitudinal acceleration of the towing portion of the articulated vehicle over a time period with the signals received from the remote unit representing the measurement of the dynamic longitudinal acceleration of the towed portion of the articulated vehicle over the time period; and means for coupling the remote unit with the base unit and associating the towing portion of the articulated vehicle with the towed portion of the articulated vehicle based on the comparison of the signals received from the base unit and the remote unit over the time period representing the respective measurements of the longitudinal accelerations of the towing portion and the towed portion of the articulated vehicle.

7. The electronic control unit as set forth in claim 6, wherein:
the signals received by the electronic control unit from the base unit represent the measurement by the base unit of the longitudinal acceleration of the towing portion of the articulated vehicle; and
the signals received by the electronic control unit from the remote unit represent the measurement by the remote unit of the longitudinal acceleration of the towed portion of the articulated vehicle.

8. A method for associating a base camera on a towing portion of a vehicle with a remote camera on a towed portion of the vehicle, the method comprising:
receiving base signals, in an electronic control unit, from a base sensor, on the towing portion of the vehicle, representing a measurement of a dynamic longitudinal acceleration of the towing portion of the vehicle;
receiving remote signals, in the electronic control unit, from a remote sensor, on the towed portion of the vehicle, representing a measurement of a dynamic longitudinal acceleration of the towed portion of the vehicle, the base sensor being initially uncoupled from the remote sensor and the towing portion of the vehicle initially being unassociated from the towed portion of the vehicle;
determining a comparison value as a sum of absolute values of differences of the base signals and the remote signals; and
transmitting a signal in the electronic control unit to couple the base camera with the remote camera and associate the towing portion of the vehicle with the towed portion of the vehicle based on the determining step.

9. The method for associating a base camera with a remote camera as set forth in claim 8, further including:
determining if the comparison value is below a predetermined threshold comparison value.

10. The method for associating a base camera with a remote camera as set forth in claim 9, further including:
determining to couple the base camera with the remote camera and associate the towing portion of the vehicle with the towed portion of the vehicle if the comparison value is below the predetermined threshold comparison value.

11. The method for associating a base camera with a remote camera as set forth in claim 8, further including:
determining a longitudinal acceleration of the towing portion of the vehicle based on the measurement of the dynamic longitudinal acceleration of the towing portion of the vehicle; and
determining a longitudinal acceleration of the towed portion of the vehicle based on the measurement of the dynamic longitudinal acceleration of the towed portion of the vehicle.

12. A system for associating portions of an articulated vehicle, the system comprising:
an electronic control unit on a towing portion of the articulated vehicle;
a base sensor on the towing portion of the articulated vehicle and communicating with the electronic control unit, the base sensor sensing a dynamic longitudinal acceleration of the towing portion and transmitting base signals representing the dynamic longitudinal acceleration of the towing portion; and
a remote sensor on a towed portion of the articulated vehicle and wirelessly communicating with the electronic control unit, the remote sensor sensing a dynamic longitudinal acceleration of the towed portion of the articulated vehicle and transmitting remote signals representing the dynamic longitudinal acceleration of the towed portion, the base sensor being initially uncoupled from the remote sensor and the towing portion of the vehicle being initially unassociated from the towed portion of the vehicle, the electronic control unit receiving the base signals and the remote signals and coupling the remote sensor with the base sensor and associating the towing portion of the vehicle with the towed portion of the vehicle based on comparisons representing sums of absolute values of differences of the base signals and the remote signals at predetermined time intervals over a period of time.

13. The system for associating portions of an articulated vehicle as set forth in claim 12, further including:
a second remote sensor on a second towed portion of the articulated vehicle and wirelessly communicating with the electronic control unit, the second remote sensor sensing a longitudinal acceleration of the second towed portion of the articulated vehicle and transmitting second remote signals representing the longitudinal acceleration of the second towed portion, the electronic control unit also receiving the second remote signals and coupling the second remote sensor with the base sensor and associating the towing portion of the vehicle with the towed portion of the vehicle based on comparisons representing sums of absolute values of differences of the base signals and the second remote signals at the predetermined time intervals over the period of time.

14. The system for associating portions of an articulated vehicle as set forth in claim 13, further including:
a third remote sensor on the second towed portion of the articulated vehicle and wirelessly communicating with the electronic control unit, the third remote sensor sensing a longitudinal acceleration of the second towed portion of the articulated vehicle and transmitting third remote signals representing the longitudinal acceleration of the third towed portion, the electronic control unit also receiving the third remote signals and coupling the third remote sensor with the base sensor and associating the towing portion of the vehicle with the second towed portion of the vehicle based on comparisons representing sums of absolute values of differences of the base signals and the third remote signals at the predetermined time intervals over the period of time; and
a fourth remote sensor on the second towed portion of the articulated vehicle and wirelessly communicating with the electronic control unit, the fourth remote sensor sensing a longitudinal acceleration of the second towed portion of the articulated vehicle and transmitting fourth remote signals representing the longitudinal acceleration of the fourth towed portion, the electronic control unit also receiving the fourth remote signals and coupling the fourth remote sensor with the base sensor and associating the towing portion of the vehicle with the second towed portion of the vehicle based on comparisons representing sums of absolute values of differences of the base signals and the fourth remote signals at the predetermined time intervals over the period of time.

15. A system for wirelessly associating portions of an articulated vehicle, the system comprising:

an electronic control unit on a towing portion of the articulated vehicle;

a base sensor on the towing portion of the articulated vehicle and communicating with the electronic control unit, the base sensor sensing a dynamic longitudinal acceleration of the towing portion and transmitting base signals representing the dynamic longitudinal acceleration of the towing portion; and a remote sensor on a towed portion of the articulated vehicle and wirelessly communicating with the electronic control unit, the remote sensor sensing a dynamic longitudinal acceleration of the towed portion of the articulated vehicle and transmitting remote signals representing the dynamic longitudinal acceleration of the towed portion, the base sensor being initially uncoupled from the remote sensor, the towing portion of the vehicle being initially unassociated from the towed portion of the vehicle, and the electronic control unit receiving the base signals and the remote signals and coupling the remote sensor with the electronic control unit and associating the towing portion of the vehicle with the towed portion of the vehicle based on whether a comparison acceleration value determined between the base sensor and the remote sensor is less than a predetermined comparison threshold value;

wherein the base signals represent the respective longitudinal accelerations of the towing portion at predetermined time intervals over a period to time;

wherein the remote signals represent the respective longitudinal accelerations of the towed portion at the predetermined time intervals over the period to time; and wherein the comparison acceleration value is determined as a sum of absolute values of differences of the respective longitudinal accelerations of the towing portion and the towed portion at each of the predetermined time intervals over the period of time.

16. The system for wirelessly associating portions of an articulated vehicle as set forth in claim 15, wherein:

the electronic control unit verifies the coupling of the remote sensor with the electronic control unit and the association of the towing portion of the vehicle with the towed portion of the vehicle based on subsequent base signals from the base sensor and subsequent remote signals from the remote sensor.

* * * * *